(12) United States Patent
Fujita et al.

(10) Patent No.: US 10,137,614 B2
(45) Date of Patent: Nov. 27, 2018

(54) SHEET MANUFACTURING APPARATUS (71) Applicant: SEIKO EPSON CORPORATION, Tokyo (JP)

(72) Inventors: Shigeo Fujita, Nagano (JP); Nobuhito Takahashi, Nagano (JP)

(73) Assignee: Seiko Epson Corporation, Tokyo (JP)

(*) Notice: Subject to any disclaimer, the term of this patent is extended or adjusted under 35 U.S.C. 154(b) by 253 days.

(21) Appl. No.: 14/984,144

(22) Filed: Dec. 30, 2015

(65) Prior Publication Data
US 2016/0236380 A1 Aug. 18, 2016

(30) Foreign Application Priority Data
Feb. 16, 2015 (JP) .................................. 2015-027282

(51) Int. Cl.
| | | |
|---|---|---|
| *B27N 1/02* | (2006.01) | |
| *B65G 65/46* | (2006.01) | |
| *D21F 9/00* | (2006.01) | |
| *G01F 23/292* | (2006.01) | |
| *B29C 43/00* | (2006.01) | |
| *B29C 65/48* | (2006.01) | |
| *D21B 1/02* | (2006.01) | |
| *B32B 37/12* | (2006.01) | |
| *B29L 7/00* | (2006.01) | |

(52) U.S. Cl.
CPC ............ *B29C 43/006* (2013.01); *B27N 1/029* (2013.01); *B29C 65/486* (2013.01); *B65G 65/46* (2013.01); *D21B 1/021* (2013.01); *D21F 9/00* (2013.01); *G01F 23/2921* (2013.01); *B29L 2007/00* (2013.01); *B32B 2037/1238* (2013.01)

(58) Field of Classification Search
CPC ......... B05B 7/1404; B05B 7/144; B27N 1/02; B27N 1/0209; B27N 1/029; B27N 3/002; B27N 3/007; B27N 3/04; B29C 65/486; B32B 2037/1238; B65D 83/06; B65G 33/08; B65G 33/14; B65G 65/005; B65G 65/30; B65G 65/32; B65G 65/34; B65G 65/46; D21B 1/028; D21B 1/06; D21B 1/08; D21F 9/00; D21F 11/00; G01F 23/282; G01F 23/2845; G01F 23/292; G01F 23/2921; G03G 15/0831; G03G 15/0862

See application file for complete search history.

(56) References Cited

U.S. PATENT DOCUMENTS 1,862,752 A * 6/1932 Jones .................... F23K 3/00
110/104 R
2,381,505 A * 8/1945 Lindholm ............. B65B 57/145
111/38

(Continued)

FOREIGN PATENT DOCUMENTS

| JP | 07-003603 A | 1/1995 |
| JP | 2011-090271 A | 5/2011 |

*Primary Examiner* — Michael A Tolin (57) ABSTRACT

A sheet manufacturing apparatus configured to manufacture a sheet by heating and pressurizing a material containing a fiber and an additive agent includes a supplying unit configured to supply the additive agent in air, a first tank configured to communicate with the supplying unit and store the additive agent, and a second tank configured to communicate with the first tank, store the additive agent, and be able to detach from the sheet manufacturing apparatus.

3 Claims, 6 Drawing Sheets

(56) References Cited

U.S. PATENT DOCUMENTS

| | | | |
|---|---|---|---|
| 5,183,147 A * | 2/1993 | Callahan | B65G 65/46 198/524 |
| 5,240,185 A * | 8/1993 | Kaiju | B01J 8/36 222/412 |
| 5,652,947 A * | 7/1997 | Izumizaki | G03G 15/0879 399/258 |
| 5,747,824 A * | 5/1998 | Jung | A61M 1/3624 250/577 |
| 7,650,097 B2 * | 1/2010 | Yoon | G03G 15/0868 399/106 |
| 9,020,374 B2 | 4/2015 | Hamano et al. | |
| 2014/0290886 A1 * | 10/2014 | Nagai | D21H 25/04 162/252 |

* cited by examiner

SHEET MANUFACTURING APPARATUS

BACKGROUND

1. Technical Field

The present invention relates to a sheet manufacturing apparatus.

2. Related Art

To date, a method has been used in which a binder is supplied from a binder vessel while defibrating a wastepaper to manufacture a molded product made of fiber material such as a mixture of wastepaper fibers and a binder. JP-A-7-3603 is an example of such related art.

However, such a method is problematic in that when the binder in the binder vessel is depleted, it is necessary to stop an apparatus temporarily and to supply the binder to the binder vessel before restarting the apparatus, hence productivity may be lowered. Furthermore, when replenishing the binder in the binder vessel directly, there is a possibility that the binder spills from the binder vessel.

SUMMARY

An advantage of some aspects of the invention can be realized in the following embodiments or application examples.

APPLICATION EXAMPLE 1

A sheet manufacturing apparatus according to a present example manufactures a sheet by heating and pressurizing a material containing a fiber and an additive agent. The sheet manufacturing apparatus includes a supplying unit configured to supply an additive agent in air, a first tank configured to communicate with the supplying unit and store the additive agent, and a second tank configured to communicate with the first tank, stores the additive agent, and be able to detach from the sheet manufacturing apparatus.

With this configuration, the sheet manufacturing apparatus includes two tanks, i.e., a first tank and a second tank, that are used to store the additive agent, and the second tank is detachably provided to the first tank. Therefore, if the additive agent in the second tank is depleted, it is possible to supply the additive agent from the first tank. Thus, it is possible to continue the manufacturing of the sheet without stopping operation of the sheet manufacturing apparatus. Furthermore, the second tank is detachable from the first tank. Therefore, it is possible to continue the manufacturing of the sheet by supplying the additive agent from the first tank, even while the second tank is detached from the first tank. Thus, even if a user does not have the second tank to be replaced, the user does not have to stop the manufacturing of the sheet. In addition, it is possible to replenish the additive agent by attaching the second tank to the first tank, thus improving the operability at the time of replenishing the additive agent and preventing staining or spilling of the additive agent.

APPLICATION EXAMPLE 2

According to the above-mentioned example, the first tank includes a first detection unit capable of detecting the absence of the additive agent in the first tank.

When the supplying unit supplies the additive agent, the amount of the additive agent stored in the first tank is reduced. When the amount of the additive agent stored in the first tank is reduced, the additive agent in the second tank is supplied to the first tank. With this configuration, the absence of the additive agent in the first tank is detectable. Therefore, it is possible to prevent the additive agent from not being supplied during the manufacturing of the sheet.

APPLICATION EXAMPLE 3

According to the above-mentioned example, the sheet manufacturing apparatus further includes a transferring unit configured to transport the additive agent from the second tank to the first tank. The first tank includes a second detection unit capable of detecting that the amount of the additive agent in the first tank reaches an upper limit.

With this configuration, since the second detection unit detects the amount of the additive agent stored in the first tank, it is possible to accurately obtain the amount of the additive agent supplied to the first tank from the second tank.

APPLICATION EXAMPLE 4

According to the above-mentioned example, the first tank includes a third detection unit between the first detection unit and the second detection unit in a vertical direction.

With this configuration, since the third detection unit detects the amount of the additive agent stored in the first tank, it is possible to know the timing for supplying the additive agent to the first tank from the second tank.

APPLICATION EXAMPLE 5

According to the above-mentioned example, the first tank includes a hole configured to communicate with the outside of the first tank on the upper side thereof.

With this configuration, when the additive agent is introduced into the first tank, since air in the first tank escapes via the hole, the additive agent in the second tank is easily transported to the first tank.

APPLICATION EXAMPLE 6

According to the above-mentioned example, the second tank includes a fourth detection unit capable of detecting the absence of the additive agent in the second tank.

With this configuration, it is possible to detect the absence of the additive agent in the second tank.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described with reference to the drawings. In each diagram below, in order to make the size of each member or the like large enough to be recognized, measures of such members or the like are illustrated differently from the actual measures.

First Embodiment

The sheet manufacturing apparatus is, for example, an apparatus for manufacturing a sheet by heating and pressurizing a material containing a fiber and an additive agent, based on a technique to form a raw material (defibration object) Pu such as a pure pulp sheet or wastepaper into a new sheet Pr. Hereinafter, a configuration of the sheet manufacturing apparatus will be described in detail.

Figure 1:
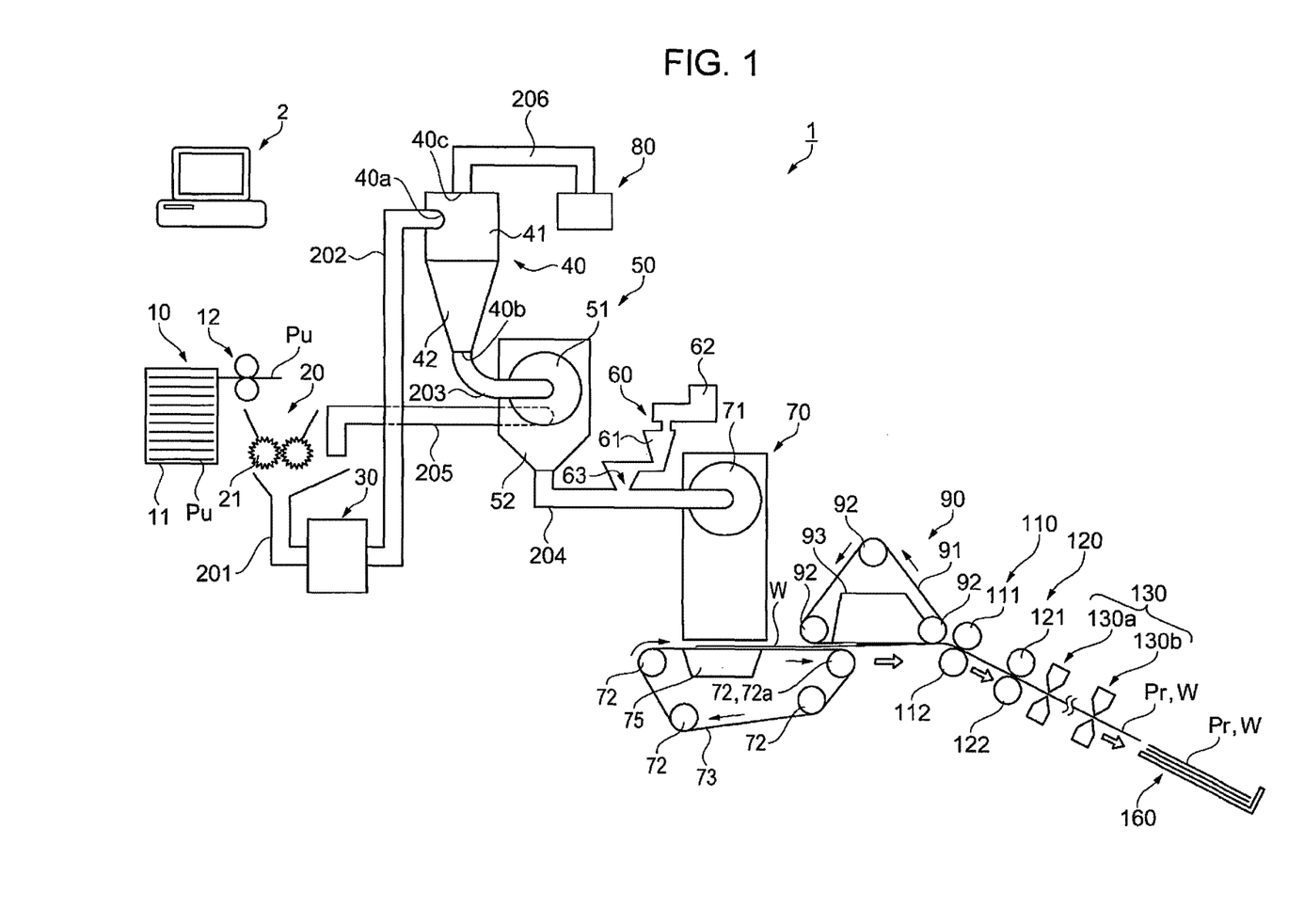
FIG. 1 is a schematic view illustrating a configuration of a sheet manufacturing apparatus.

FIG. 1 is a schematic, view illustrating a configuration of a sheet manufacturing apparatus according to a first embodiment. As illustrated in FIG. 1, the sheet manufacturing apparatus 1 of the embodiment includes a raw material supplying unit 10, a crushing unit 20, a defibrating unit 30, a classifying unit 40, a screening unit 50, an additive agent feeding unit 60, an accumulating unit 70, a heating and pressurizing unit 120, and the like. Furthermore, the sheet manufacturing apparatus includes a control unit 2 that controls these members described above.

The raw material supplying unit 10 supplies wastepaper Pu or the like as a raw material to the crushing unit 20. The raw material supplying unit 10 includes, for example, a tray 11 to pile and store a plurality of wastepaper Pu and an automatic feeding mechanism 12 or the like which allows the wastepaper Pu to be continuously fed to the crushing unit 20. The wastepaper Pu to be supplied to the sheet manufacturing apparatus 1 may be, for example, an A4 size paper or the like which is currently the mainstream paper used in offices.

The crushing unit 20 cuts the supplied wastepaper Pu into pieces of paper that are a few centimeters square. The crushing unit 20 includes crushing blades 21 and forms a unit in which the cutting width is larger than in a related art shredder. As a result of this, it is possible to easily cut the supplied wastepaper Pu into pieces of paper. The crushed paper is then supplied to the defibrating unit 30 via a tube 201.

The defibrating unit 30 defibrates materials including fibers in air. More specifically, the defibrating unit 30 includes a rotary blade (not illustrated) and defibrates the crushed paper supplied from the crushing unit 20 by untangling processing into fibers. In the invention, an object to be defibrated by the defibrating unit 30 is referred to as a defibration object, and an object which has passed through the defibrating unit 30 is referred to as a defibrated material. The defibrating unit 30 of the embodiment performs a dry-type defibrating process in the atmosphere (in air). By the defibrating process of the unit 30, coating materials or the like on paper, such as printed ink particles of inks, toners, and blur-preventing agent become particles (hereinafter, referred to as "ink particles") that are several tens of μm or less in size, separating from the fibers. Therefore, the defibrated materials exiting the defibrating unit 30 are fiber and ink particles obtained from the defibration of the pieces of paper. Furthermore, the defibrating unit 30 has a mechanism of generating airflow by rotating the rotary blade. The defibrated fibers are transferred to the classifying unit 40 in the air by an air stream via a tube 202. It is possible to separately provide an airflow generating device in the defibrating unit 30 for generating airflow for transporting the fiber defibrated to the classification unit 40 via the tube 202 on an as-needed basis.

The classifying unit 40 classifies an introduced material by using the airflow. In the embodiment, the defibrated material as the introduced material is classified into ink particles and fibers. The classifying unit 40 classifies by using the airflow the transported defibrated material into ink particles and fibers, by applying, for example, a cyclone. An airflow classifier other than a cyclone may be used. In this case, as an airflow classifier other than the cyclone, for example, an Elbow-jet, an eddy classifier, or the like may be used. The airflow classifier produces swirling air and performs separation by using a centrifugal force and the size or density of a substance to be classified such that it is possible to adjust a classification threshold by adjusting the speed or the centrifugal force of the airflow. Accordingly, the introduced material is separated into ink particles which are relatively small with lower density and fibers which are relatively large with higher density than ink particles.

The classifying unit 40 of the embodiment uses a tangential inlet cyclone. The classifying unit 40 includes an introduction port 40a into which the introduced material is introduced from the defibrating unit 30, a cylindrical portion 41 onto which the introduction port 40a is attached in a tangential direction, a conical portion 42 which is connected to the lower part of the cylindrical portion 41, a lower discharge port 40b provided at the lower part of the conical portion 42, and an upper discharge port 40c provided at the upper central part of the cylindrical portion 41 for discharging fine particles. The diameter of the conical portion 42 becomes smaller in the vertically downward direction.

In the classification process, the airflow containing the defibrated material guided in from the introduction port 40a of the classifying unit 40 is caused to move in a circular motion in the cylindrical portion 41 and the conical portion 42. Thus, a centrifugal force is applied to classify the guided-in defibrated material. The fiber material which is higher in density than the ink particles moves to the lower discharge port 40b, and the ink particles which are lower in density than the fiber material flows out from the upper discharge port 40c as fine particles in air. Then, the ink particles are discharged from the upper discharge port 40c of the classifying unit 40. The discharged ink particles are collected in the receiving portion 80 via a tube 206 connected to the upper discharge port 40c. Meanwhile, classified materials including fibers are transported in air from the lower discharge port 40b of the classifying unit 40 toward a screening unit 50 via a tube 203. The transportation of the classified materials from the classifying unit 40 to the screening unit 50 may be caused by the airflow during classification, or the classified materials may be transported by gravity from the classifying unit which is at a higher level, to the screening unit 50 which is at a lower level. Accordingly, a suction unit or the like for efficiently sucking short fiber mixtures from the upper air outlet 40c may be arranged at the upper discharge port 40c of the classification unit 40, the tube 206, or the like. Classification is not intended to divide the defibrated materials precisely by a certain size or density as a threshold. Nor is it intended to divide the defibrated materials precisely into fibers and ink particles. In some cases, a relatively small fiber material may be discharged from the upper discharge port 40c along with the ink particles. In addition, in some cases, ink particles with relatively high density may be discharged from the lower discharge port 40b along with fibers.

The screening unit 50 screens the classified materials (defibrated materials) containing the fibers classified by the classifying unit 40 by causing the classified materials to pass through a sieve portion 51 having a plurality of openings.

Further, more specifically, the screening unit 50 screens the classified materials containing the fibers classified by the classifying unit 40 into passing-through materials which pass through the openings and a residue which does not pass through the openings. The screening unit 50 of the embodiment includes a mechanism for distributing the classified materials in air by a rotating motion. The passing-through materials that pass through the openings as a result of the screening of the screening unit 50 are transported to the accumulating unit 70 side via a tube 204 from a passing-through material transferring unit 52. Meanwhile, the residue which does not pass through the openings as a result of the screening of the screening unit 50 is returned to the defibrating unit 30 via a tube 205 as the defibration object. Thus, the residue can be re-used (recycled) without being discarded.

The passing-through materials passing-through the openings as a result of the screening of the screening unit 50 are transported in air to the accumulating unit 70 via the tube 204. The transportation of the passing-through materials from the screening unit 50 to the accumulating unit 70 may be caused by an unillustrated blower which generates airflow, or the passing-through materials may be transported by gravity from the screening unit 50, which is at a higher level, to the accumulating unit 70, which is at a lower level. An additive agent feeding unit 60, which feeds a bonding resin (such as powder of a heat-curable resin or a thermoplastic resin) or the like to the transporting passing-through materials, is provided in an area between the screening unit 50 and the accumulating unit 70 in the tube 204. As an additive agent other than the bonding resin, for example, a flame retardant, a whiteness enhancer, a sheet strengthening agent, a sizing agent, an absorption modifier, a fragrance, a deodorant, or the like may be fed.

The additive agent feeding unit 60 includes a supplying unit 63 that supplies the additive agent to the tube 204 in air, a first tank 61 that communicates with the supplying unit 63, and a tank 62 that communicates with the first tank 61 and is detachable from the sheet manufacturing apparatus 1. Detailed configuration of the additive agent feeding unit 60 will be described later.

The accumulating unit 70 is intended to permit accumulation of materials containing fibers and is intended to accumulate at least a portion of the defibrated materials defibrated at the defibrating unit 30 in air. More specifically, the accumulating unit 70 forms a web W by accumulating materials including the fibers and the bonding resin fed from the tube 204 and includes a mechanism for distributing the fibers evenly in air. Furthermore, the accumulating unit 70 has a moving portion that accumulates the defibrated material as a deposited material (web W) while moving. The moving portion of the embodiment is formed of tension rollers 72 and an endless mesh belt 73 stretched by the tension rollers 72 on which a mesh is formed. Furthermore, by causing at least one of the tension rollers 72 to rotate automatically, the mesh belt 73 rotates (moves) in one direction. The web W according to the embodiment refers to a configuration of an object containing fibers and a bonding resin. Therefore, even in the case where the form such as the size of the web is changed due to heating, pressurizing, cutting, transporting, or the like, the web is still indicated as the web.

Firstly, as a mechanism to evenly distribute the fibers in air, a forming drum 71 to which the fibers and the bonding resin are fed is arranged in the accumulating unit 70. Thus, it is possible to evenly mix the bonding resin (additive agent) with the passing-through materials (fibers) by rotationally driving the forming drum 71. The forming drum 71 is provided with a screen having a plurality of small holes. The forming drum 71 rotates to evenly mix the bonding resin (additive agent) with the passing-through materials (fibers), as well as to evenly distribute the fiber and the mixture of the fiber and the bonding resin passing-through the small holes into the air.

The mesh belt 73 is arranged below the forming drum 71. Furthermore, a suction device 75 is provided in the vertically downward direction of the forming drum 71 as a suction unit to generate airflow in the vertically downward direction via the mesh belt 73. With the suction device 75, it is possible to absorb the dispersed fibers in air on the mesh belt 73.

The fibers or the like that pass through the porous screen on the surface of the forming drum 71 are accumulated on the mesh belt 73 by the suction power of the suction device 75. At this time, with the mesh belt 73 moving in the one direction, the web W containing the fibers and the bonding resin which accumulate to form an elongated shape is formed. By performing the distribution from the forming drum 71 and the movement of the mesh belt 73 continuously, a continuous belt-like web W is formed. The mesh belt 73 may be metallic, resinous, or a nonwoven fabric, as long as the mesh belt 73 allows the airflow to pass through and the fibers to accumulate thereon. If the hole diameters of the mesh belt 73 are too large, the fibers may become caught in the mesh, thus forming an uneven surface on the web W (or sheet). On the other hand, if the hole diameters of the mesh are too small, it is difficult for the suction device 75 to form stable airflow. For this reason, the hole diameters of the mesh are preferably appropriately adjusted. The suction device 75 may be configured from a sealed box with a window having the desired size opened below the mesh belt 73 to suction air from outside the window to produce negative pressure inside the box with respect to the outside air.

The web W formed on the mesh belt 73 is transported according to a transfer direction (white arrow in FIG. 1) by rotation of the mesh belt 73. An intermediate transferring unit 90 is arranged as a peeling unit on the upper side of the mesh belt 73. The web W is peeled off the mesh belt 73 by the intermediate transferring unit 90 and transported to a pressing unit 110 side. That is, the sheet manufacturing apparatus has the peeling unit (intermediate transferring unit 90) which peels the deposited material (web W) off the moving portion (mesh belt 73) and that is able to transport the peeled deposited material (web W) to the pressing unit 110. The intermediate transferring unit 90 is configured in a manner in which the web W is transportable while the web W is being sectioned vertically upward (direction in which the web W is separated from the mesh belt 73). The intermediate transferring unit 90 is arranged so as to be spaced, from the mesh belt 73 in a vertically upward direction (direction perpendicular to the surface of the web W). Furthermore, the intermediate transferring unit 90 is arranged such that the mesh belt 73 and a portion of the intermediate transferring unit 90 are shifted downstream in the transport direction of the Web W. The transporting section of the intermediate transferring unit 90 is a section from the tension roller 72a on the downstream side of the mesh belt 73 to the pressing unit 110.

The intermediate transferring unit 90 includes a transport belt 91, a plurality of tension rollers 92, and a suction chamber 93. The transport belt 91 is an endless mesh belt on which a mesh stretched by the tension rollers 92 is formed.

By causing at least one of the tension rollers 92 to rotate automatically, the mesh belt 73 rotates (moves) in one direction.

The suction chamber 93 is arranged on the inner side of the transport belt 91, has a hollow box shape having a top surface and four side surfaces in contact with the top surface, and has a bottom surface (the surface facing the transport belt 91 positioned below) which is open. In addition, the suction chamber 93 is provided with a suction unit generating airflow (suction force) to the suction chamber 93. Then, the inner space of the suction chamber 93 is sectioned by driving the suction unit, and the air flows from the bottom surface of the suction chamber 93. Thus, airflow directed over the suction chamber 93 is generated, thereby, it is possible to adsorb the web W onto the transport belt 91 by sucking the web W from the upper side of the web W. Then, the transport belt 91 moves (circulates) by the rotation of the tension rollers 92. Thus, the web W is transported toward the pressing unit 110. Furthermore, when the suction chamber 93 is viewed from above, a portion of the suction chamber 93 overlaps the mesh belt 73. Since the suction chamber 93 is located on the downstream side of the suction device 75 at a position that does not overlap the suction device 75, the web W on the mesh belt 73 may be adsorbed onto the transport belt 91 and peeled from the mesh belt 73 in a position facing the suction chamber 93. The tension rollers 92 rotate so as to move the transport belt 91 at the same speed as the mesh belt 73. If there is a difference in the speed of the mesh belt 73 and the transport belt 91, the web W may be pulled, resulting in buckling or breaking. However, by maintaining the same speed, this may be prevented.

A pressing unit 110 is arranged on the downstream side of the intermediate transferring unit 90 in the transfer direction of the web W. The pressing unit 110 is formed of a pair of pressing rollers 111 and 112 and pressurizes the transporting web W. For example, the web W is pressurized by the pressing unit 110, such that the thickness of the web W becomes approximately ⅕ to 1/30 the thickness of the web W that is formed by the accumulating unit 70. Thus, it is possible to improve the strength of the web W.

A heating and pressurizing unit 120 is arranged on the downstream side of the pressing unit 110 in the transfer direction of the web W. The heating and pressurizing unit 120 heats and pressurizes the web W that has accumulated as the deposited materials in the accumulating unit 70. The heating and pressurizing unit 120 bonds the fibers contained in the web W with the bonding resin. The heating and pressurizing unit 120 of the embodiment is formed of a pair of heating rollers 121 and 122. A heating element such as a heater is provided at the center of each rotating shaft of the heating rollers 121 and 122. By passing the web W through the pair of heating rollers 121 and 122, the transporting web W is heated and pressurized. Then, as the web W is heated and pressurized by the pair of heating rollers 121 and 122, the bonding resin melts enabling the resin to easily entangle with the fibers, and the fiber intervals become shorter, increasing the number of contact points between the fibers.

On the downstream side in the transfer direction of the heating and pressurizing unit 120, as a cutting unit 130 for cutting the web W, a first cutting portion 130a for cutting the web W in the transfer direction of the web W and a second cutting portion 130b for cutting the web W in the direction crossing the transfer direction of the web W are arranged. The first cutting portion 130a is, for example, a slitter, cutting the web W according to a predetermined cutting position in the conveying direction of the web W. The second cutting portion 130b is, for example, a rotary cutter, cutting the continuous form of the web W according to a set cutting position to a predetermined length in cut-sheet form. As a result, a desired size of a sheet Pr (web W) is formed. The cut sheet Pr is stacked in a stacker 160 or the like. Instead of cutting the web W, the sheet manufacturing apparatus may be formed such that the sheet W, remaining in a continuous form, is wound by a winding roller. As described above, it is possible to produce the sheet Pr in the sheet manufacturing apparatus 1.

In the embodiment, the "sheet" refers mainly to a substance in which the raw material contains fibers such as wastepaper and pure pulp made into a sheet form. However, the sheet is not limited to this. The sheet may have a board form or a web form (shape having irregularities). Furthermore, the raw material may be plant fibers such as cellulose, plastic fibers such as polyethylene terephthalate (PET), chemical fibers such as polyester, or animal fibers such as sheep wool or silk. The sheet as used in the invention is divided into paper and non-woven fabric. Paper includes forms such as a thin sheet form, including recording paper and the like for the purpose of writing or printing, wallpaper, wrapping paper, colored paper, Kent paper, and the like. Non-woven fabric is thicker and has lower strength than paper, including non-woven fabric, fiber board, tissue paper, paper towel, cleaner, filter, water absorbing material, a sound absorbing body, cushioning material, a mattress, and the like.

Furthermore, the wastepaper as used in the above embodiment refers mainly to a printed paper. However, if the raw material is formed as a paper, it is regarded as wastepaper regardless of whether or not it has been used.

Figure 2:
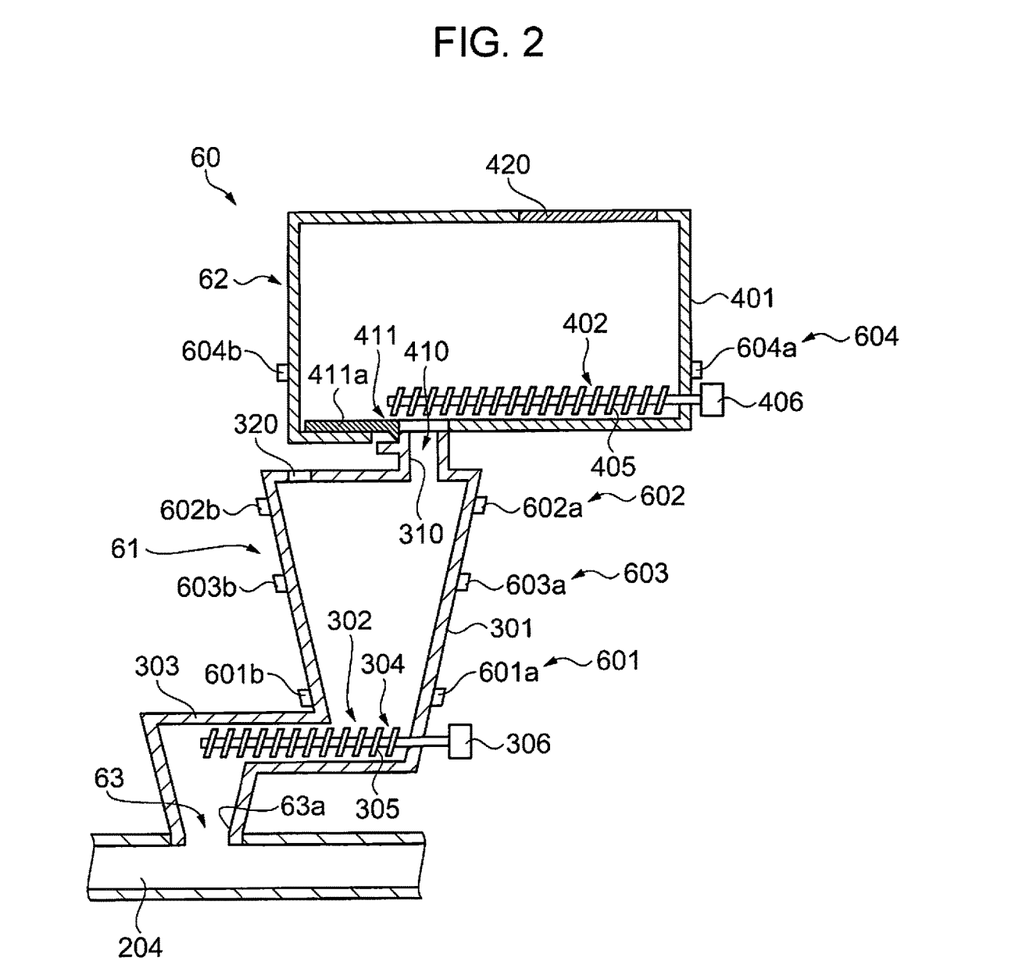
FIG. 2 is a schematic view illustrating a configuration of an additive agent feeding unit.
Figure 3:
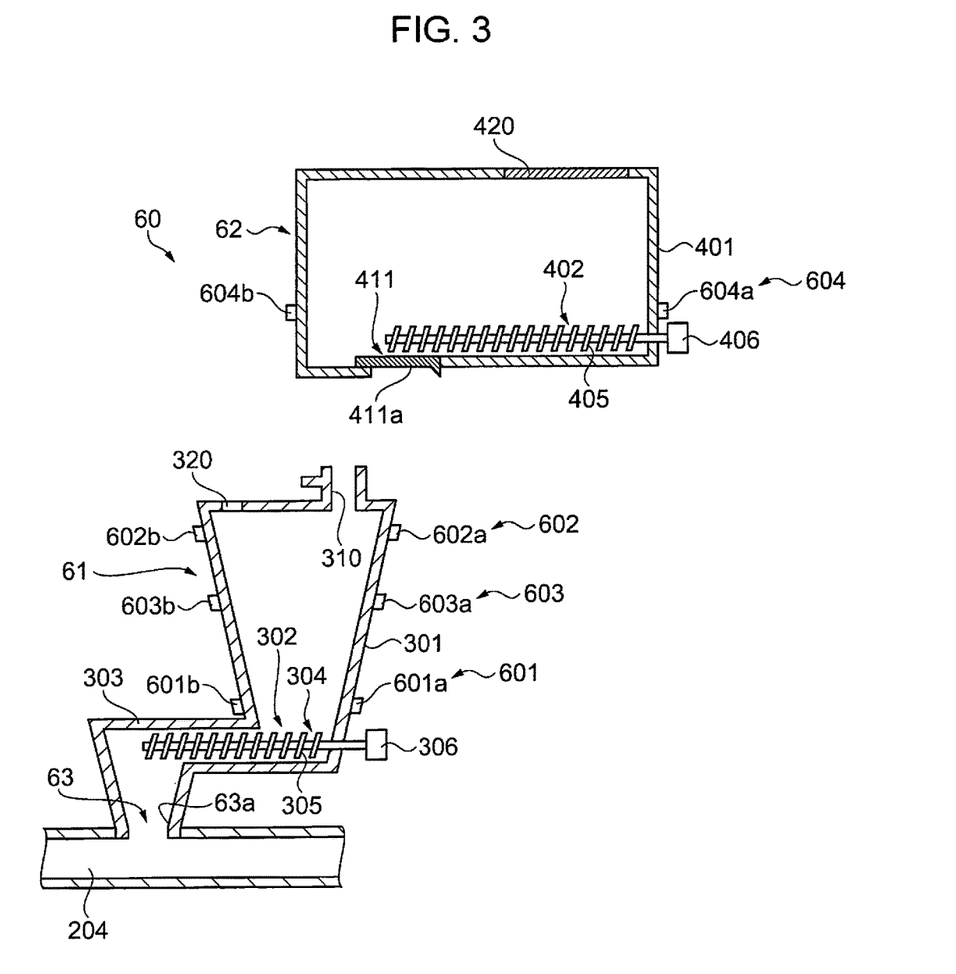
FIG. 3 is a schematic view illustrating a configuration of the additive agent feeding unit.

Next, a configuration of the additive agent feeding unit will be described. FIG. 2 and FIG. 3 are schematic views illustrating the configuration of the additive agent feeding unit. FIG. 2 is the schematic view for a case in which a first tank and a second tank are connected. FIG. 3 is the schematic view for a case in which the first tank and the second tank are disconnected.

As illustrated in FIG. 2, the additive agent feeding unit 60 includes a supplying unit 63 that supplies the additive agent in air, the first tank that communicates with the supplying unit 63 and stores the additive agent, and the second tank 62 that communicates with the first tank 61, is detachable from the sheet manufacturing apparatus 1, and stores the additive agent.

The supplying unit 63 includes an opening 63a and is configured such that the additive agent being transported from the first tank 61 side is supplied to the tube 204 via the opening 63a.

The first tank 61 includes a first container 61 to store the additive agent. The first container 301 of the embodiment has a substantially conical shape and is arranged such that the cross-sectional area in the horizontal direction of the first container 301 gradually decreases downward.

A transferring unit 302 is arranged below the first container 301. In the first transferring unit 302, a communication route 303 which causes the first container 301 and the supplying unit 63 to communicate, and a first screw feeder 304 are arranged. The first screw feeder 304 includes a spiral screw portion 305 and a motor 306 connected to the screw portion 305. By driving the motor 306, the screw portion 305 rotates. Thus, the additive agent in the first container 301 may be transported quantitatively to the opening 63a side.

A second tank 62 is arranged above the first container 301 of the first tank 61. The second tank 62 includes a second container 401 to store the additive agent. The second container 401 of the embodiment has a substantially rectangular parallelepiped shape. The second tank 62 is user detachable, whereas the first tank 61 is secure and not detachable by the user.

Furthermore, below the second container 401 in a state in which the second tank 62 is connected to the first tank 61, a second screw feeder 402 is arranged as a transferring unit to transport the additive agent from the second tank 62 to the first tank 61. The second screw feeder 402 includes a spiral screw portion 405 and a motor 406 connected to the screw portion 405.

Furthermore, below the second container 401 in the state in which the second tank 62 is connected to the first tank 61, an opening 310 and an opening 410 connected to the opening 310 are provided above the first container 301 of the first tank 61. By driving the motor 406, the screw portion 405 is rotated, thus the additive agent stored in the second container 401 may be quantitatively transported to the first tank 61 via the openings 410 and 310. Meanwhile, a valve 411 is provided at the opening 410 of the second tank 62. The valve 411 is provided with a lid 411a and a spring member (not illustrated) biasing the lid 411a, and the lid 411a is formed to be movable. By this, the opening 410 is able to open and close according to the movement of the lid 411a. In the state in which the second tank 62 is connected to the first tank 61, the lid 411a is slid, and the state of the opening 410 becomes an open state.

Furthermore, the first tank 61 has a first detection unit 601 that is capable of detecting the absence of the additive agent in the first tank 61. The first detecting unit 601 is, for example, formed of a photodetector, which includes a light emitting portion 601a for emitting light and a light receiving portion 601b for receiving light emitted from the light emitting portion 601a. The light emitting element of the light emitting portion 601a may be, for example, a light emitting diode (LED) element, and the light receiving section 601b may include a phototransistor or a photo IC and the like. The light emitting portion 601a and the light receiving portion 601b are arranged on the outer surface of the lowermost position of the first container 301. Thus, it is easy to detect the absence of the additive agent in the first tank 61. Furthermore, a resin material or the like having a light-transmitting property form the part of the first container 301 at which the light emitting portion 601a and the light receiving portion 601b are arranged. Therefore, light emitted from the light emitting portion 601a of the first detection unit 601 is transmitted through the first container 301 and received by the light receiving portion 601b. The absence of the additive agent in the first detection unit 601 may be detectable in various degrees. For example, a complete absence of the additive agent in the first tank 61 may be directly detectable, whereas a near-end state in which the additive agent in the first tank 61 is almost depleted (for example, a state in which the additive agent in the first tank 61 is 5% or less with regards to a full state) may also be detectable. The first detection unit 601 is connected to the control unit 2, and detection data from the first detection unit 601 is sent to the control unit 2.

Furthermore, the first tank 61 includes a second detection unit 602 which is capable of detecting that the amount of the additive agent in the first tank 61 is at the upper limit. The configuration of the second detection unit 602 is the same as the configuration of the first detecting unit 601, and the second detection unit is formed of a light emitting portion 602a and a light receiving portion 602b. The light emitting portion 602a and the light receiving portion 602b are arranged on the outer surface of the upper position of the first container 301. Thus, it is possible to accurately obtain the amount of the additive agent supplied from the second tank 62 to the first tank 61. Furthermore, a resin material or the like having a light-transmitting property form the part of the first container 301 at which the light emitting portion 602a and the light receiving portion 602b are arranged. Therefore, light emitted from the light emitting portion 602a of the second detection unit 602 is transmitted through the first container 301 and is received by the light receiving portion 602b. The second detection unit 602 is connected to the control unit 2, and detection data from the second detection unit 602 is sent to the control unit 2.

Moreover, the first tank 61 includes a third detection unit 603 between the first detection unit 601 and the second detection unit 602 in a vertical direction. The configuration of the third detection unit 603 is the same as the configuration of the first detecting section 601, and the third detection unit 603 is formed of a light emitting portion 603a and a light receiving portion 603b. The light emitting portion 603a is arranged between the light emitting portion 601a and the light projecting portion 602a in the vertical direction, and the light receiving portion 603b is arranged between the light receiving portion 601b and the light receiving portion 602b in the vertical direction. This makes it possible to obtain the timing of supplying the additive agent from the second tank 62 to first tank 61. Furthermore, a resin material or the like having a light-transmitting property form the part of the first container 301 at which the light emitting portion 603a and the light receiving portion 603b are arranged. Therefore, light emitted from the light emitting portion 603a of the third detection unit 603 is transmitted through the first container 301 and is received by the light receiving portion 603b. The third detection unit 603 is connected to the control unit 2, and detection data from the third detection unit 603 is sent to the control unit 2.

For communicating with the outside (atmosphere) of the first tank 61, a hole 320 is provided at the upper side of the first tank 61. In the embodiment, the hole 320 is provided above the second detection unit 602 at the top part of the first container 301. Thus, when the additive agent enters the first tank 61 from the second tank 62, the air escapes from the first tank 61 via the hole 320. Therefore, the movement (transportation) of the additive agent from the second tank 62 to the first tank 61 may become easier.

Furthermore, the second tank 62 includes a fourth detection unit 604 that is capable of detecting the absence of the additive agent in the second tank 62. The configuration of the fourth detection unit 604 is the same as the configuration of the first detection unit 601, and fourth detection unit 604 is formed of a light emitting portion 604a and a light receiving portion 604b. The light emitting portion 604a and the light receiving portion 604b are arranged on the outer surface of the lower position of the second container 401. Thus, it is possible to easily obtain the absence of the additive agent in the second tank 62. Furthermore, a resin material or the like having a light-transmitting property form the part of the second container 401 at which the light emitting portion 604a and the light receiving portion 604b are arranged. Therefore, light emitted from the light emitting portion 604a of the fourth detection unit 604 is transmitted through the second container 401 and is received by the light receiving portion 604b. The absence of the additive agent in the fourth detection unit 604 may be detectable in certain degrees. For example, a complete absence of the additive agent in the second tank 62 may be directly detectable, whereas a near-end state in which the additive agent in the second tank 62 is almost depleted (for example, a state in which the additive agent in the second tank 62 is 5% or less with regards to a full state) may also be detectable. The fourth detection unit 604 is connected to the control unit 2, and detection data from the fourth detection unit 604 is sent to the control unit 2.

Then, for example, if the absence of the additive in the second tank 62 is detected, the second tank 62 is formed to be detachable from the first tank 61 (sheet manufacturing apparatus 1) by the user, as illustrated in FIG. 3. Thus, the additive agent in the second tank 62 may be replenished when the second tank 62 is in a standalone state. Here, even when the second tank 62 is disconnected from the first tank 61, the first tank 61 is capable of supplying the additive agent to the tube 204. Therefore, it is possible to continue the production of the sheet W (sheet Pr) while the second tank 62 empty of the additive agent is replaced with the second tank 62 replenished with the additive agent or a new second tank 62 filled with the additive agent. Thus, it is possible to continue the production of the web W (sheet Pr) without stopping the driving of the sheet manufacturing apparatus 1. Therefore, even when the user does not have the second tank 62 filled with the additive agent or the additive agent for replenishing at hand, it is possible to continue the production of the web W with the additive agent in the first tank 61.

When the second tank 62 is detached from the first tank 61 (sheet manufacturing apparatus 1), the lid 411a of the valve 411 is moved by a spring bringing the opening 410 into a closed state, as illustrated in FIG. 3. Thus, the additive agent remaining in the second tank 62 is less likely to be spilled outside. In addition, at the opposite side the valve 411 in the second container 401 of the second tank 62 (upper side of the second container 401), an openable and closable lid member 420 is provided. By opening the lid member 420, it is possible to replenish the additive agent in the second tank 62. Therefore, it is possible to replenish the additive agent in a state in which the second container 401 (second tank 62) is detached from the sheet manufacturing apparatus 1. When attempting to replenish the additive agent in a state in which the second container 401 is connected to the sheet manufacturing apparatus 1, replenishing may be difficult due to other members being present. Furthermore, there is a possibility of the additives spilling from the second container 401, soiling the inside of the sheet manufacturing apparatus 1. By replenishing the second container 401 by detaching the second container 401 from the sheet manufacturing apparatus 1, the replenishing becomes easier, and the inside of the sheet manufacturing apparatus 1 will not be soiled. In place of replenishing the additive agent, the new second tank 62 filled with the additive agent may be used.

Figure 4:
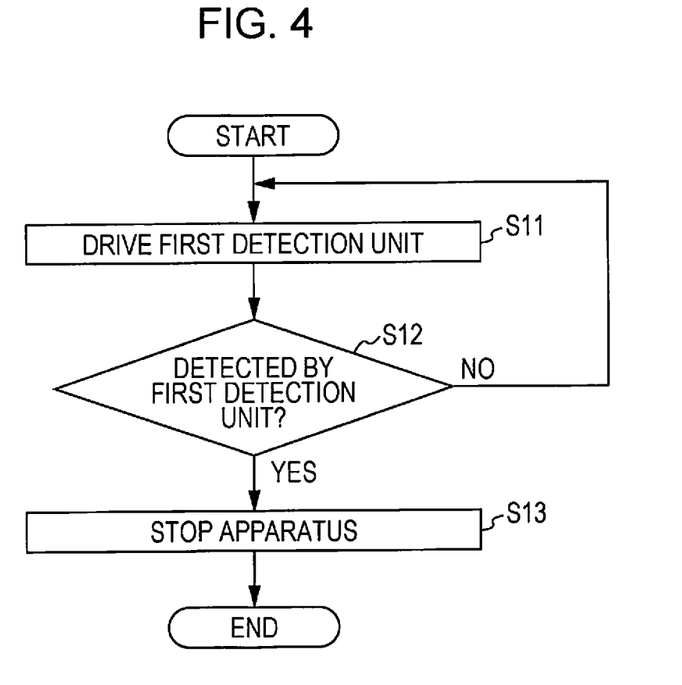
FIG. 4 is a flowchart illustrating a control method of the sheet manufacturing apparatus.
Figure 5:
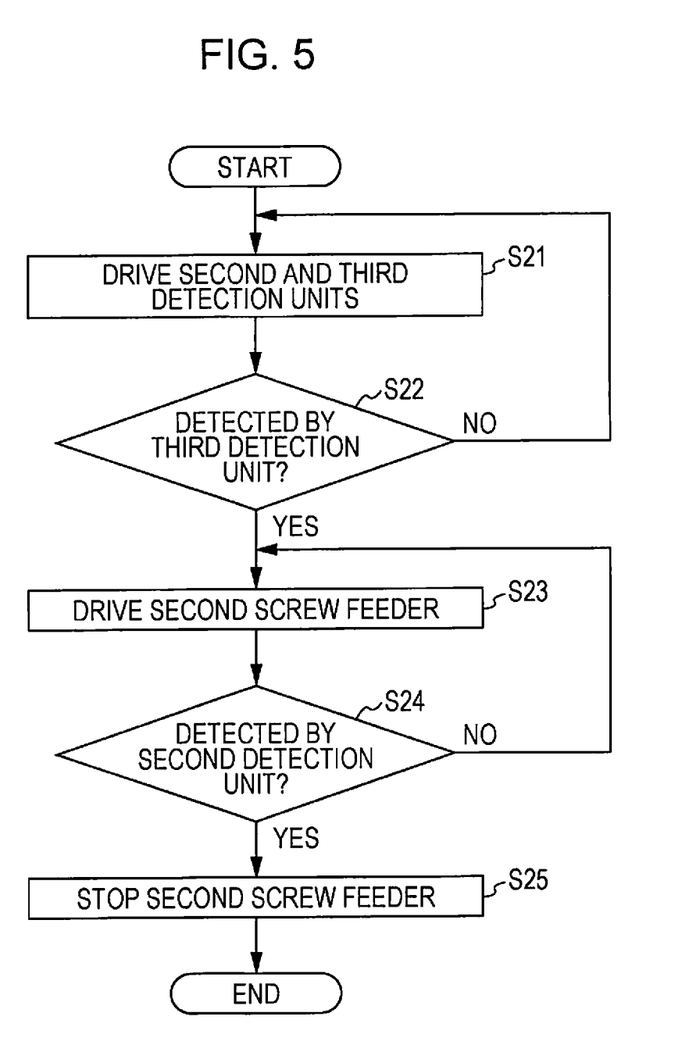
FIG. 5 is a flowchart illustrating a control method of the sheet manufacturing apparatus.
Figure 6:
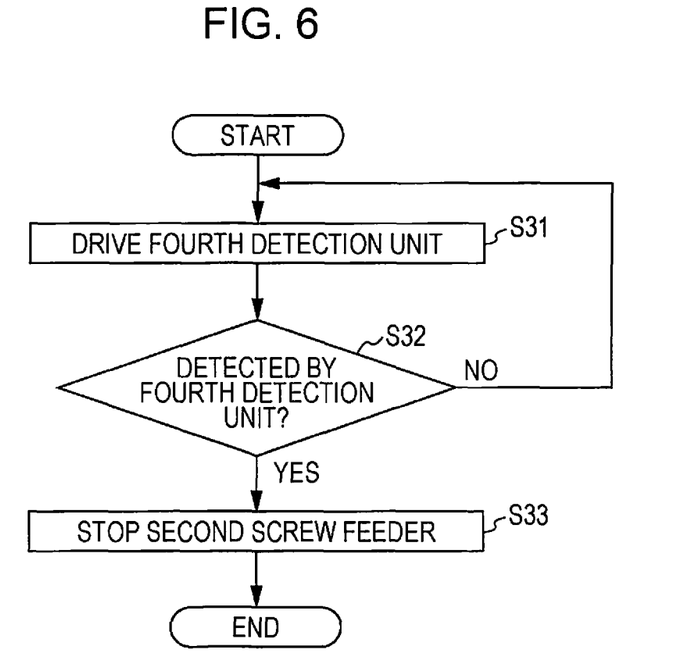
FIG. 6 is a flowchart illustrating a control method of the sheet manufacturing apparatus.

Next, a control method for the sheet manufacturing apparatus will be described. In particular, a control method according to the additive agent feeding unit of the sheet manufacturing apparatus 1 will primarily be described. FIG. 4 to FIG. 6 are flowcharts illustrating the control method of the sheet manufacturing apparatus.

First, a control method according to the first detection unit 601 will be described. The first detecting unit 601 is set to a detectable state in step S11 in FIG. 4.

Next, in step S12, it is determined as to whether or not detection has been made by the first detection unit 601. That is, a determination is made as to whether or not the additive agent is absent in the first tank 61. Then, when it is determined that the additive agent is absent in the first tank 61 (Yes), the processing proceeds to step S13. When it is determined that the additive agent is present in the first tank 61 in step S12 (No), the processing returns to step S11.

When the processing proceeds to step S13, the operation of the sheet manufacturing apparatus may be stopped. More specifically, operation of at least the members of the upstream side of the additive agent feeding unit 60 (for example, the raw material supplying unit 10, the crushing unit 20, the defibrating unit 30, the classifying unit 40, the screening unit 50 and the like) in the supply direction of the raw material or other material and the like is stopped. This makes it possible to avoid continuing the production of the web W in a state in which the additive agent is not supplied to the fiber supplied from the pipe 204.

Next, control methods according to the second and third detection units 602 and 603 will be described. The second and third detection units 602 and 603 are set to detectable states in step S21 in FIG. 5.

Next, in step S22, it is determined whether or not detection has been made by the third detection unit 603. That is, a determination is made as to whether or not to transport the additive agent to the first tank 61. Then, when a determination is made to transport the additive agent to the first tank 61 (Yes), the processing proceeds to step S23. When a determination is made not to transport the additive agent to the first tank 61 in step S22 (No), the processing returns to step S21.

Then, when the processing proceeds to step S23, the second screw feeder 402 is set. Thus, the additive agent in the second tank 62 is transported to the first tank 61 via the openings 410 and 310.

Next, in step S24, it is determined whether or not detection has been made by the second detection unit 602. That is, a determination is made as to whether or not the amount of the additive agent in the first tank 61 is at the upper limit. Then, when it is determined that the amount of the additive agent in the first tank 61 is at the upper limit (Yes), the processing proceeds to step S25. When it is determined that the amount of the additive agent in the first tank 61 is not at the upper limit in step S24 (No), the processing returns to step S23.

When the processing proceeds to step S25, the driving of the second screw feeder 402 is stopped. Thus, the transportation of the additive agent from the second tank 62 to the first tank 61 is stopped. Therefore, the start and end timings of the transportation of the additive agent from the second tank 62 to first tank 61 become clear. Furthermore, by the second detection unit detecting that the amount of the additive agent is at the upper limit, it is possible to prevent leakage of the additive agent from the hole 320, as well as to prevent compression of the additive agent by the drive of the second screw feeder 402 continuing in a state in which the first tank 61 is filled with the additive agent.

Next, a control method according to the fourth detection unit 604 will be described. The fourth detection unit 604 is set to a detectable state in step S31 in FIG. 6.

Next, in step S32, it is determined whether or not detection has been made by the fourth detection unit 604. That is, a determination is made as to whether or not the additive agent is absent in the second tank 62. Then, when it is determined that the additive agent is absent in the second tank 62 (Yes), the processing proceeds to step S33. When it is determined that the additive agent is present in the second tank 62 in step S32 (No), the processing returns to step S31.

When the processing proceeds to step S33, the driving of the second screw feeder 402 is stopped. Furthermore, a notification is output to a display unit such as an LED lamp or an LCD panel to notify the user that there is no additive agent in the second tank 62. Then, as illustrated in FIG. 3, the user detaches the second tank 62 from the first tank 61 and replaces the empty second tank 62 with a second tank 62 filled with the additive agent.

The control method according to the first detection unit 601, the control methods according to the second and third detection units 602 and 603, and the control method according to the fourth detection unit 604 are executed in parallel. Furthermore, the priority is highest in the order of the control method according to the first detection unit 601, the control method according to the fourth detection unit 604, and the control methods according to the second and third detection units 602 and 603. That is, when detection is made by the first detection unit 601, the control method according to the fourth detection unit 604 and the control methods according to the second and third detection units 602 and 603 are stopped. Furthermore, when detection is made by the fourth detection unit 604, the control methods according to the second and third detection units 602 and 603 are stopped. According to the control methods described above, when detection is made by the third detection unit 603 which is located above the first detection unit 601, the additive agent is transported from the second tank 62 to the first tank 61. When detection is made by the fourth detection unit 604, the transportation of the additive agent stops. In this case, when the additive agent in the second tank 62 is depleted, the amount of additive agent inside the first tank 61 will be at or more than the level of the third detection unit 603. Therefore, even when the additive agent in the second tank 62 is depleted, it is possible to continue the production of the sheet with the additive agent in the first tank 61.

As described above, according to the embodiment, the following advantages may be obtained.

The additive agent feeding unit 60 includes the supplying unit 63, the first tank 61, and the second tank 62. The second tank 62 is attached in a detachable manner to the first tank 61. Thus, it is possible to supply the additive agent from the first tank 61 even while the second tank 62 is detached from the first tank 61. Therefore, it is possible to continue the manufacturing of the sheet Pr without stopping the driving of the sheet manufacturing apparatus 1.

The invention is not limited to the above-mentioned embodiment. It is possible to add various kinds of changes and improvements or the like to the above-mentioned embodiment. Modified examples are described hereinafter.

MODIFIED EXAMPLE 1

In the above embodiment, the first container 301 of the first tank 61 has a substantially conical shape. However, the shape of the first container 301 is not limited to this. For example, the shape of the first container 301 may be a rectangular shape, a quadrangular pyramid shape, or the like. Even in this manner, it is possible to obtain the same effect as the above. In the same way, the shape of the second container 401 of the second tank 62 is not limited to a substantially rectangular shape, as described above.

MODIFIED EXAMPLE 2

In the above embodiment, in the second tank 62, the second container 401 and the second screw feeder 402 as the transferring unit are configured as an integral structure. However, the configuration is not limited thereto. The second container 401 and the second screw feeder 402 may be separate structures. Even in this manner, it is possible to obtain the same effect as the above.

MODIFIED EXAMPLE 3

In the above embodiment, the second screw feeder 402 as the transferring unit is provided in the second tank 62. However, the configuration of the transferring unit is not limited thereto. For example, a valve mechanism may be used as the transferring unit. Even in this manner, it is possible to transport the additive agent from the second tank 62 to the first tank 61.

MODIFIED EXAMPLE 4

In the above embodiment, the additive agent transported from the first tank 61 side is supplied to the tube 204 via the opening 63*a*. However, the configuration is not limited thereto. The additive agent may be supplied to the screening unit 50 or the accumulating unit 70.

MODIFIED EXAMPLE 5

In the above embodiment, when a detection is made at each of the first, second, and fourth detection units, the first screw feeder 304 or the second screw feeder 402 stops. However, the screw feeder may stop after rotating for a predetermined number of times. Since the screw feeder may supply the additive agent quantitatively, the screw feeder may be stopped on the assumption that the additive agent became depleted after supplying a fixed amount when the detection is made by each detector.

MODIFIED EXAMPLE 6

In the above embodiment, the fourth detection unit 604 is provided on the second tank 62. However, the configuration is not limited thereto. For example, the detection unit 604 may be provided in the sheet manufacturing apparatus 1 and may be configured when the second tank 62 is attached so that the detection unit 604 is arranged opposite to the part on the second container 401 having the light-transmitting property.

The entire disclosure of Japanese Patent Application No. 2015-027282, filed Feb. 16, 2015 is expressly incorporated by reference herein.

What is claimed is:

1. A sheet manufacturing apparatus configured to manufacture a sheet by heating and pressurizing a material containing a fiber and an additive agent, the apparatus comprising:
    a supplying opening configured to supply an additive agent in air;
    a first tank configured to communicate with the supplying opening and store the additive agent, the first tank including
        a first photoelectric detector configured to detect an absence of the additive agent in the first tank,
        a second photoelectric detector configured to detect that an amount of the additive agent in the first tank reaches an upper limit, and
        a third photoelectric detector disposed between the first photoelectric detector and the second photoelectric detector in a vertical direction and configured to detect the amount of the additive agent in the first tank and; and
    a second tank configured to communicate with the first tank and store the additive agent, the second tank being detachably attached to the sheet manufacturing apparatus, the second tank including a screw feeder configured to transport the additive agent from the second tank to the first tank, the screw feeder being configured to commence to transport the additive agent from the second tank to the first tank in response to the third photoelectric detector detecting the amount of the additive agent in the first tank, the second tank including an opening through which the second tank is configured to communicate with the first tank and including a valve slidable relative to the opening of the second tank between an opening position at which the valve opens the opening of the second tank and a closing position at which the valve closes the opening of the second tank.

2. The sheet manufacturing apparatus according to claim 1, wherein the first tank includes a hole configured to communicate with an outside of the first tank on the upper side thereof.

3. The sheet manufacturing apparatus according to claim 1, wherein the second tank further includes a fourth photoelectric detector configured to detect an absence of the additive agent in the second tank.

* * * * *